United States Patent Office 3,078,295
Patented Feb. 19, 1963

3,078,295
PROCESS FOR PRODUCTION OF DITHIOLPHOS-PHORIC ACID ESTERS
Gerhard Schrader, Wuppertal-Cronenberg, Germany, assignor to Farbenfabriken Bayer Aktiengesellschaft, Leverkusen, Germany, a corporation of Germany
No Drawing. Filed Aug. 31, 1960, Ser. No. 53,071
Claims priority, application Germany Sept. 4, 1959
1 Claim. (Cl. 260—461)

The present invention relates to and has as its objects a new and economic process for the production of dithiolphosphoric acid esters as well as some new insecticidal phosphoric acid esters, which may be prepared according to this process.

In accordance with the present invention it has been found that dithiolphosphoric acid esters having the following formula

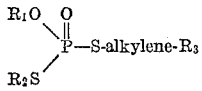

wherein $R_1$ and $R_2$ represent lower alkyl groups and $R_3$ is an alkyl- or aryl-mercapto group can be readily obtained by reacting O.O.S-trialkyl-thiophosphates with alkali metal mercaptides, and by bringing the resulting O.S-dialkylthiolphosphoric acid salts to reaction with the appropriate halogenalkyl compounds. Examples of halogenalkyl compounds to be used according to the present invention are the following, without, however, limiting this invention thereto:

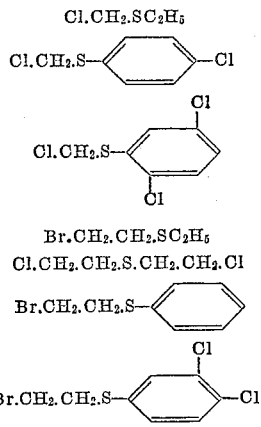

It is already known to prepare the above compounds e.g. according to a process described in U.S. Patent 2,881,201, i.e. by reacting appropriate phosphoric acid chlorides with appropriate mercaptans. The process according to the invention has the remarkably technical advantage of being simpler in carrying out as compared with this known process, and that surprisingly the end products are obtained in a better yield and with a higher purity.

The compounds obtainable according to the invention are known to be valuable pest control agents, which are chiefly employed for plant protection. Part of them, as said above, are new.

The new compounds of the present invention very effectively kill insects like flies, mites, aphids etc. They distinguish themselves especially by a good contact-insecticidal activity and at the same time by an activity against eating insects such as caterpillars. They may be used in the same manner as other known phosphoric acid insecticides, i.e. in a concentration from about 0.00001% to about 1%, diluted or extended with suitable solid or liquid carriers or diluents. Examples of such carriers are talc, chalk, bentonite, clay and the like, as liquid carriers there may be mentioned water (if necessary with commercial emulsifiers, alcohols, especially lower alcohols, such as methanol or ethanol, ketones, especially lower ketones, such as acetone or methyl ethyl ketone, liquid hydrocarbons and the like. The new compounds may furthermore be used in combination with each other or with known insecticides, fertilizers etc.

As examples for the special utility of the inventive compounds the compounds of the following formulae

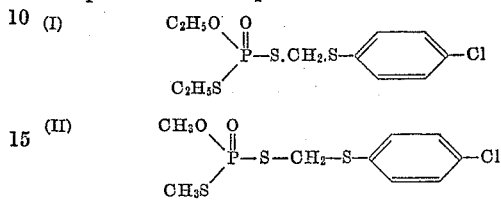

have been tested against spider mites. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test has been carried out as follows:

Against spider mites: bean plants (*Phaseolus vulgaris*) of about 15 inches height were sprayed drip wet with solutions as prepared above in concentrations as indicated in the table below. The bean plants have been infested heavily with the two-spotted spider (species *Tetranychus telarius*). Evalution has been carried out after 24 hours, 48 hours and 8 days. The following results have been obtained:

| Compound | Aqueous concentration (in percent active ingredient/water) | Killing rate (in percent) |
|---|---|---|
| (I) | 0.001 | 100 |
| (II) | 0.0001 | 90 |

The following examples are given for illustrating the present invention.

Example 1

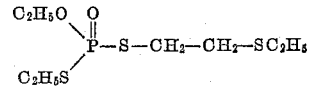

107 grams (0.5 mol) of O.O.S-triethyl-thionophosphate are dissolved in 200 ml. of anhydrous alcohol. 50 grams of potassium ethyl mercaptide are added to the solution. This is heated to 80° C. for one hour, with stirring, and 63 grams (0.5 mol) of β-chloroethyl-thioethyl ether are then added with further stirring. The temperature is maintained at 75–80° C. for another hour, the reaction product is then cooled to room temperature, and placed into 300 ml. of ice-water. The separated oil is taken up in 200 ml. of benzene, freed from water with sodium sulfate and thereafter fractionated. By this method there are obtained 107 grams of the ester with B.P. 87° C./0.01 mm. Hg. Yield 78% of the theoretical. The ester is a colorless oil, insoluble in water.

Calculated for molecular weight 274: S, 35.0%; P, 11.3%. Found: S, 34.8%; P, 10.7%.

Example 2

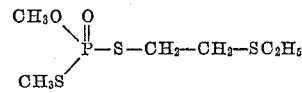

50 grams of potassium ethyl mercaptide are dissolved in 200 ml. of methanol. 0.86 grams (0.5 mol) of O.O.S-trimethyl-thionophosphate are added at 70° C. with stirring, this is heated at 70–75° C. for one hour, and 63 grams of β-ethylmercaptoethyl chloride are then added dropwise with further stirring. Reaction product is maintained at 70–75° C. for one hour, cooled to room temperature and then placed into 300 ml. of ice-water. After working up as usual, there are obtained 84 grams of the ester as a pale yellow oil, insoluble in water, with B.P. 70° C./0.01 mm. Hg. Yield 68% of the theoretical.

Calculated for molecular weight 246: S, 39.0%; P, 12.6%. Found: S, 38.6%; P, 12.8%.

*Example 3*

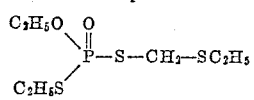

25 grams of potassium ethyl mercaptide are dissolved in 100 ml. of anhydrous alcohol. To this is added at 80° C. with stirring 54 grams (0.25 mol) of thionophosphoric acid-O.O.S-triethyl ester (B.P. 86° C./2 mm. Hg). The mixture is heated to 80° C. for one hour, and 28 grams of α-chloromethyl-thioethyl ether are then added dropwise at 30–40° C. with further stirring. Heating is continued at 40° C. for another hour, and the product then worked up in the usual manner. There are obtained 40 grams of the ester with B.P. 78° C./0.01 mm. Hg. Yield 62% of the theoretical. The ester is a colorless oil which is insoluble in water.

Calculated for molecular weight 260: S, 36.5%; P, 11.9%. Found: S, 35.4%; P, 11.7%.

*Example 4*

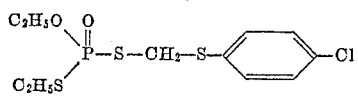

25 grams of potassium ethyl mercaptide are dissolved in 100 ml. of anhydrous alcohol. 54 grams (0.25 mol) of thionophosphoric acid-O.O.S-triethyl ester are added dropwise at 80° C., with stirring. The mixture is maintained at 80° C. for one hour, and 49 grams of 4-chlorophenyl-α-chloromethyl thioether are then added at 40° C. with further stirring. Stirring is continued at 40–50° C. for an hour, and the product then worked up in the usual manner. 56 grams of the new ester are thus obtained as a water-insoluble yellow oil. The ester can only be distilled with decomposition, even in high vacuum.

Calculated for molecular weight, 343: S, 27.9%; Cl, 10.4%; P, 9.0%. Found: S, 27.3%; Cl, 11.0%; P, 8.6%.

Aphids are killed completely with 0.01% solutions. Spider mites are killed completely with 0.001% solutions. The compound has an ovicidal activity.

By exactly the same way there may be obtained the compound of the following formula:

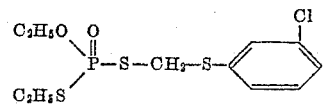

*Example 5*

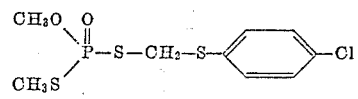

49 grams (0.25 mol) of phosphoric acid-O.S-dimethylthiolic acid potassium salt are dissolved in 100 ml. of acetonitrile. 49 grams of 4-chlorophenyl-α-chloromethyl-thioether are added at 60° C. with stirring. The product is heated at 60° C. for one hour, and then workd up in the usual manner. 48 grams of the novel ester are thus obtained as a water-insoluble yellow oil. The ester can only be distilled with decomposition even in a high vacuum.

Spider mites are killed to 90% with 0.0001% solutions. Caterpillars are killed completely with 0.1% solutions. The compound has an ovicidal activity.

By exactly the same way there may be obtained the compounds of the following formulae

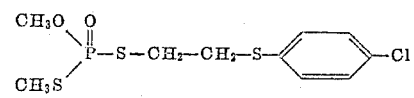

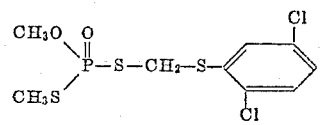

I claim:

The process for the production of dithiophosphoric acid esters of the general formula

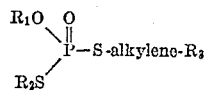

wherein $R_1$ and $R_2$ stand for lower alkyl groups up to 4 carbon atoms, alkylene is a radical selected from the group consisting of methylene and ethylene and $R_3$ is a member selected from the group consisting of alkyl mercapto groups and phenyl mercapto groups, which comprises reacting O.O.S-trialkyl thiolphosphates with alkali metal mercaptides and reacting the resulting O.S-dialkyl-thiolphosphoric acid salts with appropriate halogenalkyl compounds.

References Cited in the file of this patent

UNITED STATES PATENTS

| 2,793,224 | Fancher | May 21, 1957 |
| 2,881,201 | Schrader | Apr. 7, 1959 |

FOREIGN PATENTS

| 212,101 | Australia | Jan. 9, 1958 |
| 789,122 | Great Britain | Jan. 15, 1958 |